United States Patent
Thapliyal et al.

(10) Patent No.: US 10,733,549 B2
(45) Date of Patent: Aug. 4, 2020

(54) FOCUS AWARE PRODUCTIVITY TOOL

(71) Applicant: GetGo, Inc., Boston, MA (US)

(72) Inventors: Ashish V. Thapliyal, Santa Barbara, CA (US); Elizabeth Thapliyal, Santa Barbara, CA (US); Laura Martin, Santa Barbara, CA (US); Ryan W. Kasper, Goleta, CA (US); Ye Zhou, San Francisco, CA (US)

(73) Assignee: LogMeIn, Inc., Boston, MA (US)

( * ) Notice: Subject to any disclaimer, the term of this patent is extended or adjusted under 35 U.S.C. 154(b) by 1243 days.

(21) Appl. No.: 14/969,271

(22) Filed: Dec. 15, 2015

(65) Prior Publication Data

US 2017/0169382 A1 Jun. 15, 2017

(51) Int. Cl.
*G06Q 10/00* (2012.01)
*G06Q 10/06* (2012.01)
*G06Q 10/10* (2012.01)

(52) U.S. Cl.
CPC . *G06Q 10/063114* (2013.01); *G06Q 10/1093* (2013.01)

(58) Field of Classification Search
None
See application file for complete search history.

(56) References Cited

U.S. PATENT DOCUMENTS

| 7,388,971 | B2 | 6/2008 | Rice et al. | |
| 2009/0006574 | A1* | 1/2009 | Horvitz | G06F 9/485 709/207 |
| 2012/0239451 | A1* | 9/2012 | Caligor | G06Q 10/00 705/7.21 |
| 2013/0006064 | A1* | 1/2013 | Reiner | A61B 5/4884 600/300 |
| 2013/0073329 | A1* | 3/2013 | Shoham | G06Q 10/10 705/7.18 |
| 2014/0030684 | A1* | 1/2014 | Steinmetz | G09B 5/00 434/247 |

(Continued)

OTHER PUBLICATIONS

Fritz & Muller, Leveraging Biometric Data to Boost Software Developer Productivity, 2016, International Conference on Software Analysis, Evolution, and Reengineering, 23rd, all pages (Year: 2016).*

(Continued)

*Primary Examiner* — Hafiz A Kassim
*Assistant Examiner* — Zahra Elkassabgi
(74) *Attorney, Agent, or Firm* — BainwoodHuang

(57) ABSTRACT

Techniques for managing a user's tasks based on the user's focus level. High focus time slots are identified during which the user has a high level of focus, as well as low focus time slots during which the user has a low level of focus. Tasks for completion by the user are scheduled such that the high focus time slots are allocated to tasks that require a high level of user focus, and the low focus time slots are allocated to tasks that require a low level of user focus. High focus times may be identified based on user indications and/or on biometric data describing the user's physical state. Interruption requests may also be managed based on the user's focus level. Necessary resources may be pre-loaded prior to the high focus time periods, and breaks may be automatically scheduled to maintain the user's high level of focus.

26 Claims, 10 Drawing Sheets

---

| COMPARE TIME REQUIRED TO COMPLETE THE TASK TO DURATION OF HIGH FOCUS TIME SLOT | 302 |

↓

| IF TIME REQUIRED TO COMPLETE TASK EXCEEDS DURATION OF HIGH FOCUS TIME SLOT THEN i) GENERATE HIGH LEVEL OF FOCUS REQUIRED TO COMPLETE TASK AND ii) DIVIDE TASK INTO CHUNKS EACH HAVING A DURATION THAT IS LESS THAN THE DURATION OF THE HIGH FOCUS TIME SLOT | 304 |

↓

| ALLOCATE INDIVIDUAL HIGH FOCUS TIME SLOTS TO INDIVIDUAL CHUNKS OF THE TASK | 306 |

(56) References Cited

U.S. PATENT DOCUMENTS

| | | | |
|---|---|---|---|
| 2014/0058801 A1* | 2/2014 | Deodhar | G06Q 10/0639 |
| | | | 705/7.38 |
| 2015/0046233 A1* | 2/2015 | Srulowitz | G06Q 10/06398 |
| | | | 705/7.42 |
| 2016/0171633 A1* | 6/2016 | DeWalt | G06Q 50/08 |
| | | | 705/7.15 |
| 2017/0039877 A1* | 2/2017 | Gimenez Molinelli | |
| | | | G16H 50/20 |

OTHER PUBLICATIONS

Cirillo, Francesco, "The Pomodoro Technique" Creative Commons Attribution, San Francisco, CA, Oct. 19, 2006, 45 pages.

Heishman et al. "Using Eye Region Biometrics to Reveal Affective and Cognitive States", Computer Vision and Pattern Recognition Workshop, Jun. 2, 2004, 69 pages, IEEE.

\* cited by examiner

FOCUS AWARE PRODUCTIVITY TOOL

BACKGROUND

As it is generally known, in the modern, automated work environment, workers are expected to perform an increasingly large number of tasks with a high level of efficiency. At the same time, workers are also being made available for frequent communication with their co-workers, collaborators, and/or customers. A wide array of applications assist workers in accomplishing the tasks that are assigned to them. These technologies enable each worker to be simultaneously responsible for a large number of different tasks, each one of which may require a different set of applications and/or other resources. While the availability of easy to use communication tools keeps workers continuously connected, available, and well informed at all times, it also has the consequence of making workers face an increasing number of interruptions.

The increasing number of tasks assigned to each worker, and the increasing use of communication tools, make it difficult for workers to effectively manage their work schedule. In particular, each worker has only a limited amount of high focus time each day, during which they have a high level of engagement with a current task. Usually, large strategic tasks don't get the attention they deserve because workers get interrupted by urgent but less strategic tasks. Management of such high focus time periods is critically important, since they are typically the worker's most productive times. A worker's high focus time is highly valuable, and should be carefully managed in terms of its appropriate allocation, protection, and maximization.

SUMMARY

Unfortunately, previous technologies for supporting user productivity have operated without recognition of a user's focus level. For example, previous systems do not use the user's level of focus when scheduling the user's tasks. Previous systems accordingly schedule tasks that do not require a high level of focus during times when the user has a high level of focus, and schedule tasks that require a high level of focus during times when the user has a low level of focus.

Previous systems also do not use a user's focus level when controlling interruptions by communication tools (e.g. emails, texts, etc.). As a result, low priority interruptions are allowed during times at which the user has a high level of focus, potentially squandering the user's valuable high focus time on activities that do not require a high level of focus.

Previous systems may require the user to use their high focus time to set up a necessary work context when performing a task requiring a high level of focus. As a result, the user must use their valuable high focus time to obtain resources required for the task to be performed, before they can even begin working on the task.

In addition, previous systems do not help the user maximize their high focus time. Specifically, previous systems include no capability to schedule breaks that help maintain a user's high level of focus for a long period of time. Since many users' are reluctant to take breaks, they do not take breaks, and/or users may also forget to take breaks. In either case, the result is reduced productivity and increased error rates.

To address these and other shortcomings of previous technologies, a new technical solution is disclosed that automatically manages a user's tasks based on the user's focus level. The disclosed solution may be embodied as a productivity tool that identifies high focus time slots during which the user has a high level of focus, and low focus time slots during which the user has a low level of focus. When tasks are received for completion by the user, an electronic scheduling operation is performed for each received task. The electronic scheduling operation allocates a set of the high focus time slots in an electronic calendar to each received task that requires a high level of user focus, and allocates a set of the low focus time slots in the electronic calendar to each received task that requires a low level of user focus.

For example, the required level of focus for one or more of the received tasks may be expressly indicated by the user, e.g. through a graphical user interface generated by the productivity tool. In another example, the required level of focus for one or more of the received tasks may be received with the received tasks, and reflect an indication of the required level of focus for the received task indicated by another user (e.g. the user's supervisor).

Alternatively, a required level of focus for one or more received tasks may be automatically generated by comparing an amount of time required to complete the task to a duration of a single high focus time slot for the user. For example, the time required to complete longer-term strategic tasks, such as planning, and/or other specific longer-term strategic tasks, may exceed the duration of a single high focus time slot. A high required level of focus may be generated for a task in response to the time required to complete the task exceeding the duration of the high focus time slot. A low required level of focus may be generated for the task in response to the time required to complete the task not exceeding the duration of the high focus time slot.

Further in the case where the amount of time required to complete one or more of the received tasks exceeds the duration of the high focus time slot, the received task may be divided into multiple parts or sub-tasks, referred to herein as "chunks," such that each chunk has a duration that does not exceed the duration of a high focus time slot. Allocating the set of high focus time slots to the received task may then include allocating multiple high focus time slots (e.g. on multiple days), such that different ones of the high focus time slots are allocated to different individual chunks of the received task.

In order to maintain the user's high level of focus, interruption requests (e.g. email messages, text messages, phone calls etc.) received when the user has a high level of focus may be controlled by identifying high priority and low priority interruption requests received while the user has a high level of focus, and delivering only the high priority interruption requests to the user while the user has a high level of focus. For example, the disclosed system may operate to identify interruption requests that are related to a current task as high priority, and to identify interruption requests that are unrelated to the current task as low priority. Low priority interruption requests may be stored on a queue while the user has a high level of focus. The low priority interruption requests stored on the queue may be delivered to the user when the user no longer has a high level of focus.

Interruption requests received while the user has a high level of focus may also be controlled by delivering an identifier of an alternative, high priority communication channel to a requester associated with each of the high priority interruption requests.

A user's context switching time at the beginning of a high focus time slot may be reduced by identifying resources needed by the user during the high focus time slot, and automatically pre-loading the resources needed by the user during the high focus time slot into a personal workspace of the user, prior to the beginning of the high focus time slot. In this way the resources needed during the high focus time slot are pre-loaded so that they are accessible to the user at the beginning of the high focus time slot. Resources identified as needed by the user during the high focus time slot may, for example, include resources used by the user during the same and/or one or more previous high focus time slots, such as documents, websites, or even music that the user was listening to during a previous high focus time slot. Pre-loading the resources needed by the user during the high focus time slot may include playing the music that the user was listening to during the previous high focus time slot starting at the beginning of the high focus time slot.

The user's context switching time between tasks may also be reduced by allocating adjacent time slots in the electronic calendar to related tasks.

Appropriate duration cushion time periods may also be allocated in the electronic calendar, to allow appropriate amounts of time for the user to switch between tasks, based on the relatedness of adjacently scheduled tasks, and/or on measurements of how long the user has previously taken to switch between tasks. Small cushion time periods may be allocated between time slots allocated to related tasks, and large cushion time periods may be allocated between time slots allocated to un-related tasks. The specific length of the cushion time periods may be determined based on previous measurements of how long the user has taken to switch between related tasks and between unrelated tasks.

The disclosed productivity tool may use focus data for the user that is received by and/or generated by the productivity tool in order to identify the durations and specific times of high focus time slots and low focus time slots within the user's electronic calendar. In one example, the productivity tool may generate focus data for the user by periodically polling the user to obtain a current focus level indicating the user's level of engagement with their current task at different times of day. For example, the polling may include periodically prompting the user to indicate a current focus level through a graphical user interface generated by the productivity tool. The focus data generated in this way may consist of or include current focus levels indicated by the user at different times of day within a previous polling period, e.g. within a previous day.

Alternatively, or in addition, the focus data for the user may be generated by prompting the user (e.g. within the graphical user interface generated by the productivity tool) to expressly enter or otherwise indicate daily time periods during which the user typically has a high level of focus.

In another example, the productivity tool may receive focus data that is based on or includes biometric information for the user, e.g. from an application programming interface (API) of a separate application program, such as a user health application program. The focus data received from the API of the user health application program may, for example, include indications of the user's level of focus at different times of day, based on biometric data describing the user's physical state at those times. The focus data received from the separate application program may include indications of the user's level of engagement with a current task at different times of day as indicated by user biometric data (e.g. collected by and received from one or more biosensors), and that indicates the user's physical state (e.g. heart rate, breathing rate, brain wave indicators, pupil size, skin conductivity, location, physical orientation/direction facing, etc.) at different times of day.

The productivity tool may also maintain and/or maximize the user's high focus time by automatically allocating break times for the user within the electronic calendar, during which no task is scheduled. Alerts reminding the user to take a break may be automatically generated and displayed to the user at the beginning of each break time. The allocated break times may be periodically recurring break times, and/or be dynamically determined based on user focus data indicating a user's current level of focus. The productivity tool may also generate focus data by polling the user for an indication of a current focus level at the beginning of each periodic break time, e.g. within a periodically generated visual alert that reminds the user to take a break, and that is displayed to the user in the graphical user interface. In order to ensure that the user actually takes a break, the productivity tool may also disable operation of the user's computer at the beginning of each break time, and then re-enable operation of the user's computer at the end of each break time.

The disclosed productivity tool may also take user focus level into consideration when scheduling meetings in the electronic calendar. When a request is received to allocate time in the electronic calendar for a meeting with multiple invitees, the disclosed system checks whether the requested meeting requires a high focus level. In the case where productivity tool detects that the requested meeting has a high focus requirement, the productivity tool may operate to select a time for the meeting that occurs within a high focus time slot for each of the meeting invitees.

In order to ensure that tasks that require a low level of focus are not neglected, the productivity tool may further deliver a reminder at the end of a user's high focus time identifying one or more tasks that require a low level of focus and that have not yet been completed.

Embodiments based on the disclosed techniques solve significant problems inherent in previous technologies. For example, by scheduling the user's tasks based on the user's focus level, the disclosed system avoids scheduling tasks that do not require a high level of focus during times when the user has a high level of focus, and also avoids scheduling tasks that require a high level of focus during times when the user has a low level of focus.

The disclosed system also allows the user to make better use of their high focus time, by controlling interruptions by communication tools (e.g. emails, texts, etc.) based on a recipient user's focus level.

The disclosed system also avoids wasting a user's high focus time performing context switching by setting up the user's personal workspace with the resources required for the task to be performed during the high focus time prior to the beginning of the user's high focus time.

In addition, the disclosed system helps the user maximize their high focus time by automatically scheduling breaks that help maintain the user's high level of focus during their high focus time.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
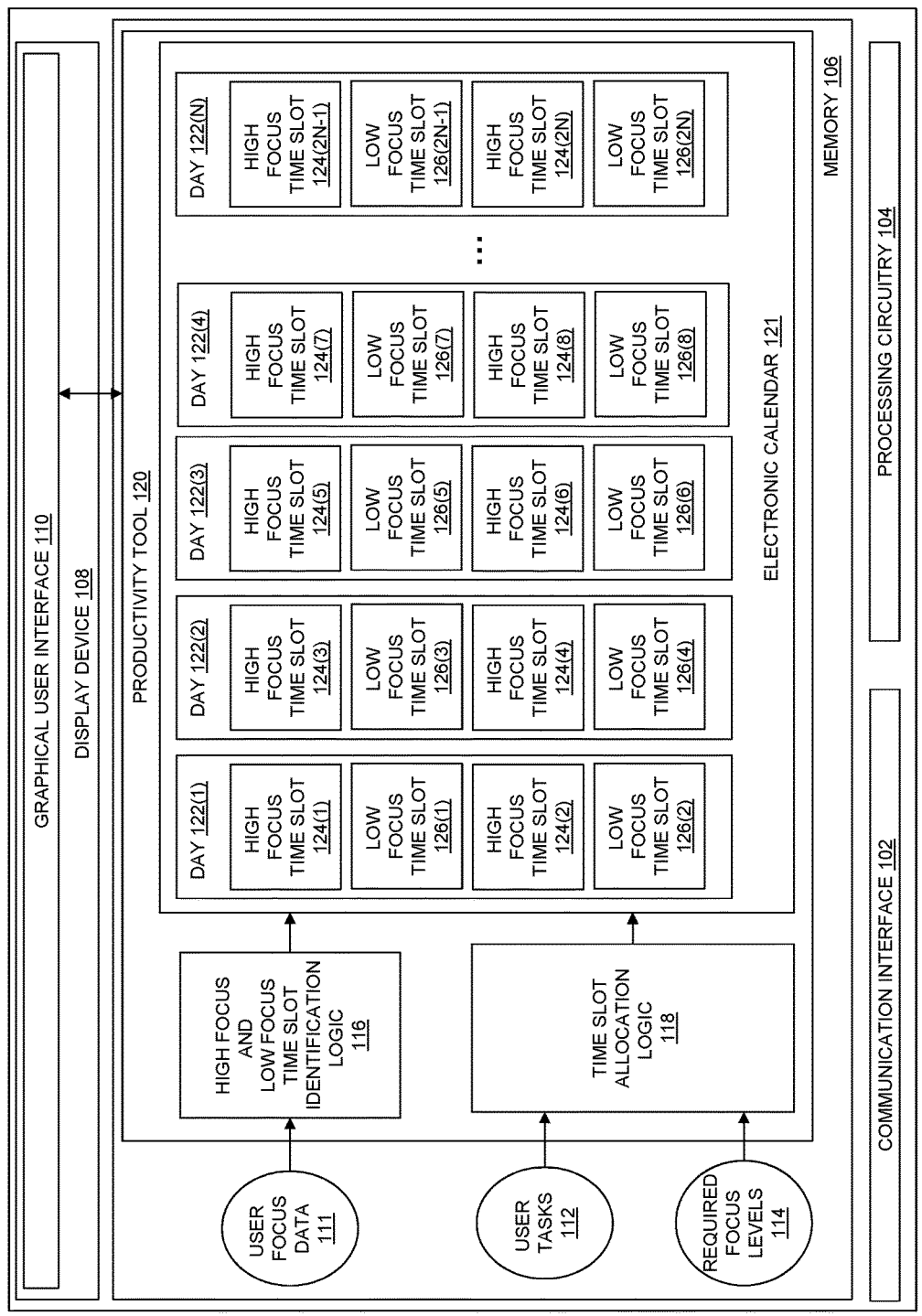
FIG. 1 is a block diagram showing components in an illustrative embodiment for managing a user's tasks based on the user's focus level, and identifying high focus time slots and low focus time slots in an electronic calendar.

FIG. 1 is a block diagram showing components in an illustrative embodiment for managing a user's tasks based on the user's focus level, and operating to identify high focus time slots and low focus time slots in an electronic calendar. As shown in FIG. 1, a Computing Device 100 includes a Communication Interface 102, Processing Circuitry 104, Memory 106, and a Display Device 108. Display Device 108 may include or consist of any specific type of output device operable to present information in visual form, such as a computer monitor or other type of electronic visual display. Communication Interface 102 may, for example, include or consist of one or more input/output interfaces, network interface cards (NICs), etc. Processing Circuitry 104 may, for example, include or consist of one or more microprocessors or the like. Memory 106 may, for example, include or consist of any specific type of volatile or non-volatile semiconductor memory or the like that is operable to store programs (sequences of instructions) and/or data (e.g. program state information) for use in the Computing Device 100. Computing Device 100 may be embodied as any specific type of computer or computer system, including but not limited to a desktop, laptop computer, or tablet computer, and/or as a computerized handheld device such as a smartphone or personal digital assistant.

In the illustrative embodiment of FIG. 1, the Memory 106 stores program code for execution on the Processing Circuitry 104, such as application program code that supports user productivity, shown in the example of FIG. 1 by Productivity Tool 120. Productivity Tool 120 may include an Electronic Calendar 121 that provides a user of Computing Device 100 with an electronic representation of the user's daily schedule, and that may be displayed in Display Device 108 and modified by the user through a Graphical User Interface 110 that is generated by the Productivity Tool 120. For example, a user of Computing Device 100 may use various specific input/output devices of Computing Device 100 when providing indications to Productivity Tool 120 as to actions represented by one or more graphical display objects within Graphical User Interface 110. Such input/output devices may, for example, include a keyboard, computer mouse, touch screen display device, etc. Productivity Tool 120 may further include High Focus and Low Focus Time Slot Identification Logic 116 and Time Slot Allocation Logic 118.

The Memory 106 further stores data used during the execution of the Productivity Tool 120, and/or generated during the execution of the Productivity Tool 120, shown in FIG. 1 as including User Focus Data 111, User Tasks 112, and Required Focus Levels 114.

Although certain software constructs are specifically shown and described herein for purposes of explanation with regard to certain illustrative embodiments, it will understood that the Memory 106 may also include various other software constructs, which are not shown, such as an operating system, various applications, and/or other software processes, agents, daemons, etc.

During operation of the components shown in FIG. 1, the Productivity Tool 120 automatically schedules tasks of the user of Computing Device 100 based on the user's focus level. For example, the High Focus and Low Focus Time Slot Identification Logic 116 may receive User Focus Data 111 indicating times of day during which the user has a high level of focus, and times of day during which the user has a low level of focus. The times of day during which the user has a high level of focus are time periods each day during which the user has a high level of concentration on and/or engagement with a task that they are currently working on. Accordingly, the times of day during which the user has a high level of focus are time periods each day during which the user is most capable of working on more complex and/or mentally demanding tasks. In contrast, the times of day during which the user has a low level of focus are time periods each day during which the user has a low level of concentration on and/or engagement with a task that they are currently working on, and accordingly are the time periods during which the user is less capable, or potentially not capable at all, of working on complex and/or mentally demanding tasks.

The User Focus Data 111 may, for example consist of indications of times of day during which the user has a high level of focus, and/or indications of times of day during which the user has a low level of focus. User Focus Data 111 may include and/or consist of data provided by the user, for example received from the user through the Graphical User Interface 110, indicating specific time periods during which the user has a high level of focus, and/or indicating specific time periods during which the user has a low level of focus. Alternatively, or in addition, User Focus Data 111 may include and/or consist of data received from an external application and based on biometric data received from one or more biometric sensors, indicating specific time periods during which the user has a high level of focus, and/or indicating specific time periods during which the user has a low level of focus. The User Focus Data 111 may be based on or include historical data regarding the user's focus level that was collected each day during a preceding focus level sampling period, e.g. collected each day during a preceding week.

For purposes of explanation, in the illustrative example of FIG. 1, User Focus Data 111 indicates that during each day the user has a high level of focus from 8:00 AM to 10:00 AM, a low level of focus from 10:00 AM to 2:00 PM, a high level of focus from 2:00 PM to 4:00 PM, and a low level of focus from 4:00 PM to 6:00 PM.

Based on User Focus Data 111, High Focus and Low Focus Time Slot Identification Logic 116 identifies high focus time slots in the Electronic Calendar 121 during which the user has a high level of focus. For example, over some number of upcoming Days 122 that are represented in the Electronic Calendar 121, e.g. regular working days occurring during one or more upcoming weeks, and shown for purposes of illustration by Day 122(1) through Day 122(N), High Focus and Low Focus Time Slot Identification Logic 116 identifies High Focus Time Slots 124. In the example of FIG. 1, since each one of Days 122 includes two high focus time slots (i.e. from 8:00 AM to 10:00 AM and from 2:00 PM to 4:00 PM), High Focus Time Slots 124 are shown by High Focus Time Slot 124(1) through High Focus Time Slot 124(2N). Specifically, for each day in Days 122, High Focus Time Slots 124 include a first high focus time slot from 8:00 AM to 10:00 AM and a second high focus time slot from 2:00 PM to 4:00 PM, shown by High Focus Time Slot 124(1) and High Focus Time Slot 124(2) in Day 122(1), High Focus Time Slot 124(3) and High Focus Time Slot 124(4) in Day 122(2), High Focus Time Slot 124(5) and High Focus Time Slot 124(6) in Day 122(3), and so on.

Also based on User Focus Data 111, High Focus and Low Focus Time Slot Identification Logic 116 identifies low focus time slots in the Electronic Calendar 121 during which the user has a low level of focus. For example, over Days 122 High Focus and Low Focus Time Slot Identification Logic 116 identifies Low Focus Time Slots 126. In the example of FIG. 1, since each one of Days 122 includes two low focus time slots (i.e. from 10:00 AM to 2:00 PM and from 4:00 PM to 6:00 PM), Low Focus Time Slots 126 are shown by Low Focus Time Slot 126(1) through Low Focus Time Slot 124(2N). Specifically, for each day in Days 122, Low Focus Time Slots 126 include a first low focus time slot from 10:00 AM to 2:00 PM and a second low focus time slot from 4:00 PM to 6:00 PM, shown by Low Focus Time Slot 126(1) and Low Focus Time Slot 126(2) in Day 122(1), Low Focus Time Slot 126(3) and Low Focus Time Slot 126(4) in Day 122(2), Low Focus Time Slot 126(5) and Low Focus Time Slot 126(6) in Day 122(3), and so on.

Figure 2:
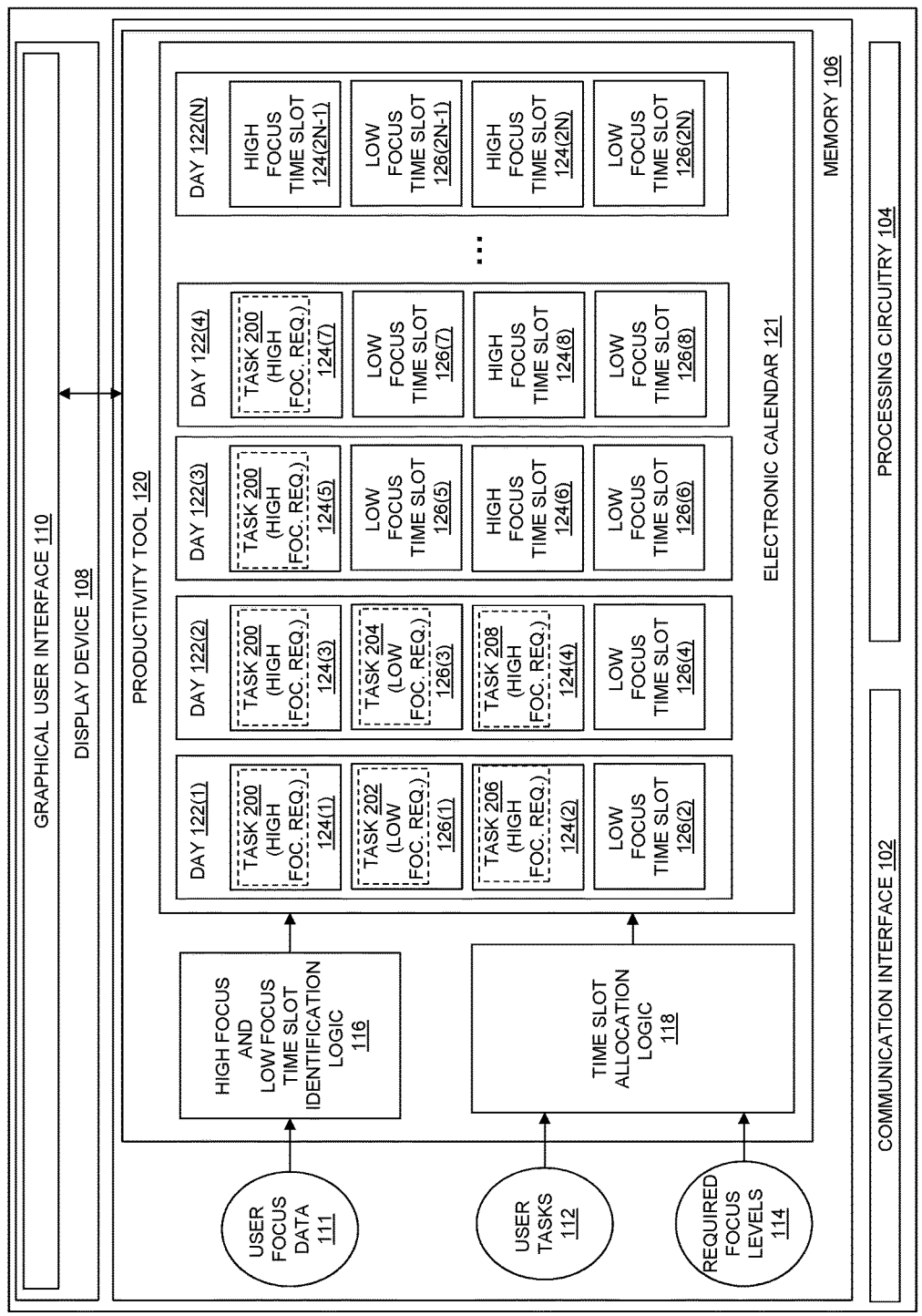
FIG. 2 is a block diagram showing components of an illustrative embodiment, and allocating high focus time slots to tasks requiring a high level of user focus, and allocating low focus time slots to tasks requiring a low level of user focus.

FIG. 2 is a block diagram showing components of the illustrative embodiment, while operating to allocate high focus time slots to tasks requiring a high level of user focus, and operating to allocate low focus time slots to tasks requiring a low level of user focus. In the example of FIG. 2, Time Slot Allocation Logic 118 receives some number of User Tasks 112. Each of User Tasks 112 includes or consists of data representing and/or describing a task that the user is at least in part responsible for completing. For example, one or more of the User Tasks 112 may include or consist of a meeting invitation or the like. In the example of a meeting invitation task, the user may be responsible for preparing for the meeting prior to the meeting, attending the meeting, and performing some number of follow up actions following the meeting. User Tasks 112 may, for example, be received by User Computer 100 from a remote meeting scheduling server system, and/or from the local user through Graphical User Interface 110.

User Tasks 112 may further include indications of which tasks are related, and which tasks are unrelated. For example, each received task in User Tasks 112 may include a list of other related tasks. Alternatively, the user may indicate through Graphical User Interface 110 a list of other related tasks for one or more of the tasks in User Tasks 112. In either case, tasks in User Tasks 112 that are not indicated to be related are or may be considered to be unrelated.

For each of the User Tasks 112, Time Slot Allocation Logic 118 automatically performs an electronic scheduling operation. The electronic scheduling operation performed by Time Slot Allocation Logic 118 for each task in the User Tasks 112 allocates time slots in Electronic Calendar 121 during which the user will work on that task. The electronic scheduling operation allocates time slots in Electronic Calendar 121 for each task in User Tasks 112 according to a required focus level for the task, as for example indicated in Required Focus Levels 114. In this way the disclosed system protects the specific times during the day that are the user's high focus time slots, so that the user can use their high focus time slots to accomplish their most important tasks (i.e. high focus level tasks). The disclosed system automatically assists the user with regard to effectively scheduling their high focus time for important tasks that may be lengthy and/or easily postponed.

Required Focus Levels 114 includes an indication of the level of user focus required to perform each of the tasks in User Tasks 112. Specifically, for each of the tasks in User Tasks 112, Focus Levels 114 may include either i) an indication that the task requires a high level of user focus, or ii) an indication that the task requires a low level of user focus. The Required Focus Levels 114 may, for example, be received with User Tasks 112 from a remote meeting scheduling server system (e.g. as provided or entered by a task-creating user such as a user that requests a meeting), and/or from the local user through Graphical User Interface 110 (i.e. reflecting the user's own assessment of the focus level for each specific task).

For each one of the tasks in User Tasks 112 that is indicated by Required Focus Levels 114 to require a high level of user focus, the electronic scheduling operation performed by Time Slot Allocation Logic 118 allocates a set of the High Focus Time Slots 124. The specific number of time slots in High Focus Time Slots 124 allocated to a task may be calculated by Time Slot Allocation Logic 118 based on a length of time associated with the task and on a duration of each of the High Focus Time Slots 124. The length of time associated with a specific task may, for example, be an estimation of user time required to complete the task that is either i) received by User Computer 100 with the task in User Tasks 112, or that is ii) entered by the local user for the task into Graphical User Interface 110 and then received by Productivity Tool 120 from the Graphical User Interface 110. Specifically, for a task that requires a high level of user focus, the electronic scheduling operation performed by Time Slot Allocation Logic 118 allocates a set of time slots in High Focus Time Slots 124 that has a cumulative length that is at least as large as length of time associated with the task. For a task that requires a low level of user focus, the electronic scheduling operation performed by Time Slot Allocation Logic 118 allocates a set of time slots in Low Focus Time Slots 126 that has a cumulative length that is at least as large as a length of time associated with the task.

In order to reduce the time required to switch between one task and another, the electronic scheduling operation performed by Time Slot Allocation Logic 118 may further group related tasks together into adjacent timeslots (i.e. at consecutive times in a given day). In this way, the user's context switching time may be reduced. In one embodiment, the Time Slot Allocation Logic 118 identifies a set of two or more of the User Tasks 112 that are related, and then searches the Electronic Calendar 121 for a set of adjacent time slots that are available for scheduling. The Time Slot Allocation Logic 118 then allocates each of the time slots in the set of adjacent time slots to a corresponding one of the related tasks in the set of related tasks. For example, the Time Slot Allocation Logic 118 may identify a set of received tasks that are related by searching through those of the User Tasks 118 that indicate a high required level of focus for at least two tasks are related to each other and that indicate a high required level of focus.

For example, when a first task is related to a second task, and where both the first task and the second task require a high level of user focus, then Time Slot Allocation Logic 118 may operate in part by searching for a pair of High Focus Time Slots 124 that are adjacent in time within a given day, and by allocating a first one of the adjacent time slots to the first task and a second one of the adjacent time slots to the second task. Larger numbers of related high focus tasks may similarly be allocated high focus time slots that are all adjacent to one another within a given day. Because the amount of time required for the user to switch between related tasks is typically shorter than the amount of time required for the user to switch between unrelated tasks, the disclosed system may accordingly reduce time required for the user to switch contexts between tasks that are allocated to High Focus Time Slots 124, thus enabling the user to more efficiently use their high focus time.

In the illustrative example of FIG. 2, an electronic scheduling operation performed by Time Slot Allocation Logic 118 for a Task 200 detects from Required Focus Levels 114 that Task 200 requires a high level of user focus, and in response allocates High Focus Time Slots 124(1), 124(3), 124(5) and 124(7) to Task 200. An electronic scheduling operation performed by Time Slot Allocation Logic 118 for a Task 202 detects from Required Focus Levels 114 that Task 202 requires a low level of user focus, and in response allocates Low Focus Time Slot 126(1) to Task 202. An electronic scheduling operation performed by Time Slot Allocation Logic 118 for a Task 204 detects from Required Focus Levels 114 that Task 204 requires a low level of user focus, and in response allocates Low Focus Time Slot 126(3) to Task 204. An electronic scheduling operation performed by Time Slot Allocation Logic 118 for a Task 206 detects from Required Focus Levels 114 that Task 206 requires a high level of user focus, and in response allocates High Focus Time Slot 124(2) to Task 206. An electronic scheduling operation performed by Time Slot Allocation Logic 118 for a Task 208 detects from Required Focus Levels 114 that Task 208 requires a high level of user focus, and in response allocates High Focus Time Slot 124(4) to Task 208.

The electronic scheduling operation performed by Time Slot Allocation Logic 118 may allocate each time slot for a given task by first displaying the time slot as a proposed time slot for the task to the user within Graphical User Interface 110. The user must then expressly approve the proposed time slot within the Graphical User Interface 110 before the electronic scheduling operation completes the allocation of the time slot to the task within Electronic Calendar 121. Alternatively, the electronic scheduling operation performed by Time Slot Allocation Logic 118 may allocate each time slot for each received task within the Electronic Calendar 121 without user interaction.

Figure 3:
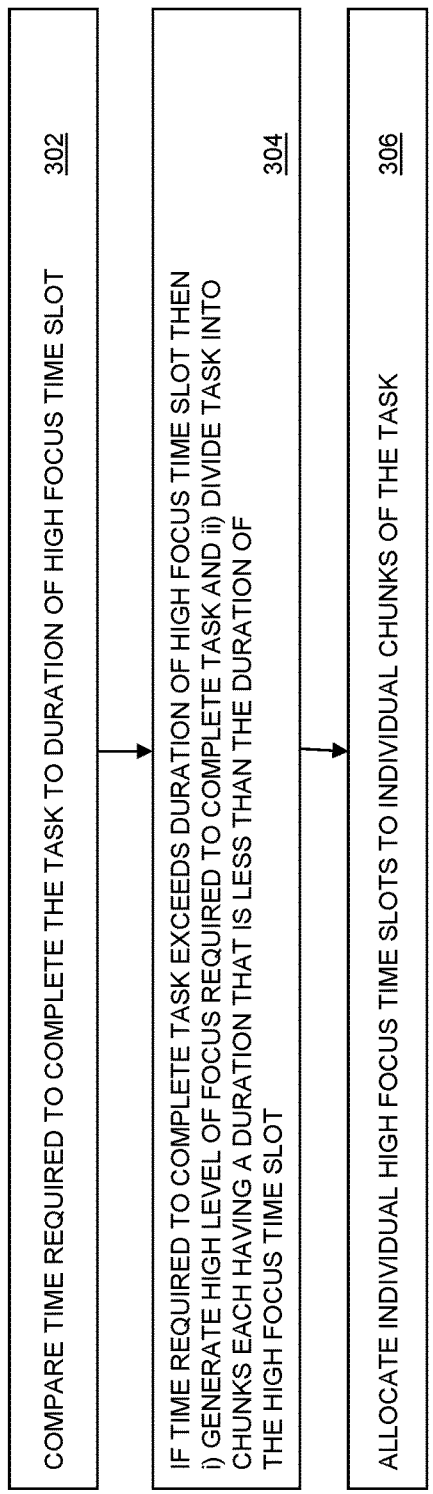
FIG. 3 is a flow chart showing an example of steps performed in an illustrative embodiment to detect that a task has a high level of required user focus level, and to divide the task into chunks having a duration that does not exceed a duration of a high focus time slot.

FIG. 3 is a flow chart showing an example of steps performed in an illustrative embodiment to determine that a task has a high level of required user focus level and to divide the task into chunks, such that each chunk has a duration that does not exceed a duration of a high focus time slot. The steps of FIG. 3 are, for example, performed by the Productivity Tool 120 of FIG. 1 (e.g. within Time Slot Allocation Logic 118). As described above, the required level of focus for one or more of the received User Tasks 112 may be expressly indicated by the user (e.g. through Graphical User Interface 110), or may be received with one or more of the received tasks (e.g. reflecting an indication of the required level of focus for a received task provided by another user, such as a meeting requester or the user's supervisor). The steps of FIG. 3 show another example of operation of the disclosed system, in which a required level of focus may be automatically generated for one or more received User Tasks 112 by, at step 302, comparing an amount of time required to complete the task to a duration of a single high focus time slot. At step 304, either i) a high required level of focus is generated for the task in the case that the time required to complete the task exceeds the duration of the high focus time slot, or ii) a low required level of focus is generated for the task in the case that the time required to complete the task does not exceed the duration of the high focus time slot. In this way, an embodiment of the disclosed system may automatically determine that tasks that have total durations greater than the duration of a user's high focus time period are to be processed as tasks that require a high level of user focus.

Also in step 304, in the case where the total amount of time required to complete one of the received tasks exceeds the duration of the high focus time slot, the received task may be divided into multiple parts or sub-tasks, referred to herein as "chunks," such that each chunk has a duration that does not exceed the duration of the user's high focus time slot. For example, the user may be prompted through the Graphical User Interface 110 to the break the task down into specific, actionable sub-tasks, each one of which can be performed during a single high focus time slot.

At step 306, allocating the set of high focus time slots to the received task during the electronic scheduling operation may then include allocating high focus time slots (e.g. on multiple days) to different individual chunks of the received task. How multiple high focus time slots are allocated to chunks of a single task may be based on user configuration, such as an indication from the user that different chunks from a single task are to be scheduled on different days, and/or based on a completion date associated with the task, so that all chunks for the task are allocated time slots prior to or on the completion date associated with the task.

Figure 4:
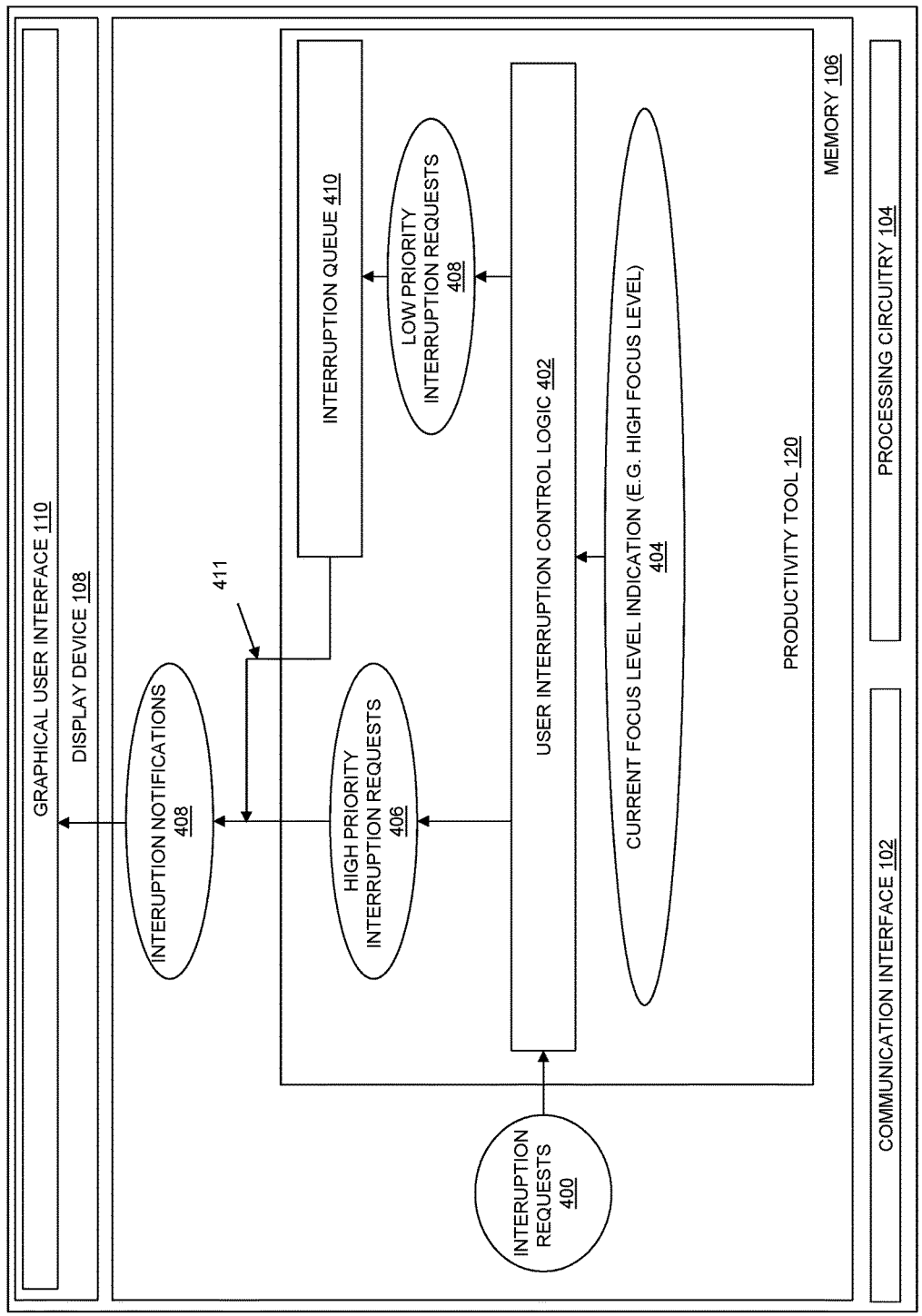
FIG. 4 is a block diagram showing components in an illustrative embodiment that control interruption requests received while the user has a high level of focus.

FIG. 4 is a block diagram showing components in an illustrative embodiment that controls interruption requests received when a user has a high focus level, e.g. within a high focus time slot. In order to maintain the user's high level of focus, Productivity Tool 120 may include User Interruption Control Logic 402 that receives and processes Interruption Requests 400. Interruption Requests 400 may, for example, include requests to deliver a message to the user, such as an electronic mail message or an instant message or text message, and/or requests to deliver a communication request to the user, such as telephone call or a video chat session.

When each request in Interruption Requests 400 is received, User Interruption Control Logic 402 detects whether the user currently has a high focus level. For example, User Interruption Control Logic 402 may detect whether the user currently has a high focus level by determining whether the request is received during a high focus time slot. User Interruption Control Logic 402 may obtain a Current Focus Level Indication 404 from the Electronic Calendar 121. The Current Focus Level Indication 404 may indicate whether a current time slot in Electronic Calendar 121 is a high focus time slot or a low focus time slot. In the case where the current time slot is a high focus time slot, the User Interruption Control Logic 402 determines that the user currently has a high focus level, and accordingly that the request is received when the user has a high focus level.

Alternatively, User Interruption Control Logic 402 may obtain a Current Focus Level Indication 404 that is based on or includes biometric data regarding the user's physical state, as for example determined based on output from one or more biosensors. Biometric data may, for example, indicate a current high focus level of the user when one or more biosensors indicate that the user is sitting with an upright posture and facing their computer, and/or may indicate a current low focus level of the user when one or more biosensors indicate that that the user is not sitting upright, is facing away from their computer, or is physically located away from their computer.

Alternatively, or in addition, the biometric data may, for example, include or consist of indications of a current high focus level or a current low focus level of the user based on outputs from one or more biosensors indicating the user's current skin conductivity, brain activity, heart rate, breathing rate, pupil dilation, facial region biometrics, eye region biometrics, and/or other specific biometric data.

In the case where Current Focus Level Indication 404 indicates to User Interruption Logic 402 that one of the requests in Interruption Requests 400 is received when the user has a high focus level, then User Interruption Control Logic 402 checks a priority level of the request. Request priority levels may be received with the requests in Interruption Requests 400. Alternatively, a priority level of a received request may be determined by User Interruption Control Logic 402 based on the source or origin of the request, so that requests received from the user's manager or supervisor are processed as high priority requests. In another alternative, a priority of a received request may be based on a subject of the received request, so that requests having as a subject the same task that the current time slot is allocated to are processed as high priority requests. In another alternative, a priority of a received request may be determined at least in part based on machine learning techniques in response to previous actions of the user. For example, a request may be processed as a high priority request if it is received from another user to whom the local user has sent one or more communication requests either during the present high focus time period, and/or during one or more preceding high focus time periods.

When an interruption request is received when the user has a high focus level, User Interruption Control Logic 402 only delivers the request to the user if the interruption request has a high priority, as illustrated in FIG. 4 by High Priority Interruption Requests 406 being delivered by User Interruption Control Logic 402 to the user through Graphical User Interface 110. When a low priority interruption request is received when the user has a high focus level, User Interruption Control Logic 402 puts the interruption request onto an interruption queue, as shown in FIG. 4 by Low Priority Interruption Requests 408 being placed onto Interruption Queue 410. When the User Interruption Logic 402 detects that the focus level of the user changes from high to low, at reference number 411 the User Interruption Control Logic 402 delivers the interruption requests stored on the Interruption Queue 410 to the user, e.g. through the Graphical User Interface 110. For example, User Interruption Control Logic 402 may detect that the user's focus level has changed from high to low in response to Current Focus Level Indication 404 changing to indicate that a high focus time slot has ended and a low focus time slot has started. Alternatively, User Interruption Control Logic 402 may detect that the user's focus level has changed from high to low in response to Current Focus Level Indication 404 changing to indicate that biometric data regarding the user's physical state, as for example received from one or more biosensors, now indicates a low focus level for the user.

User Interruption Control Logic 402 may further operate to control interruption requests received during when the user has a high level of focus by delivering an identifier of an alternative, high priority communication channel to a requester that initiated or sent one or more of the High Priority Interruption Requests 406. For example, in the case of an interruption request that is a phone call received while the user has a high level of focus, and the user is currently using their work phone to participate in a conference call, the identifier of the alternative, high priority communication channel may consist of or include a personal cell phone number of the user, thus enabling the requester to call the user on the user's cell phone even though the user has a high level of focus and cannot be currently reached through their work phone.

Figure 5:
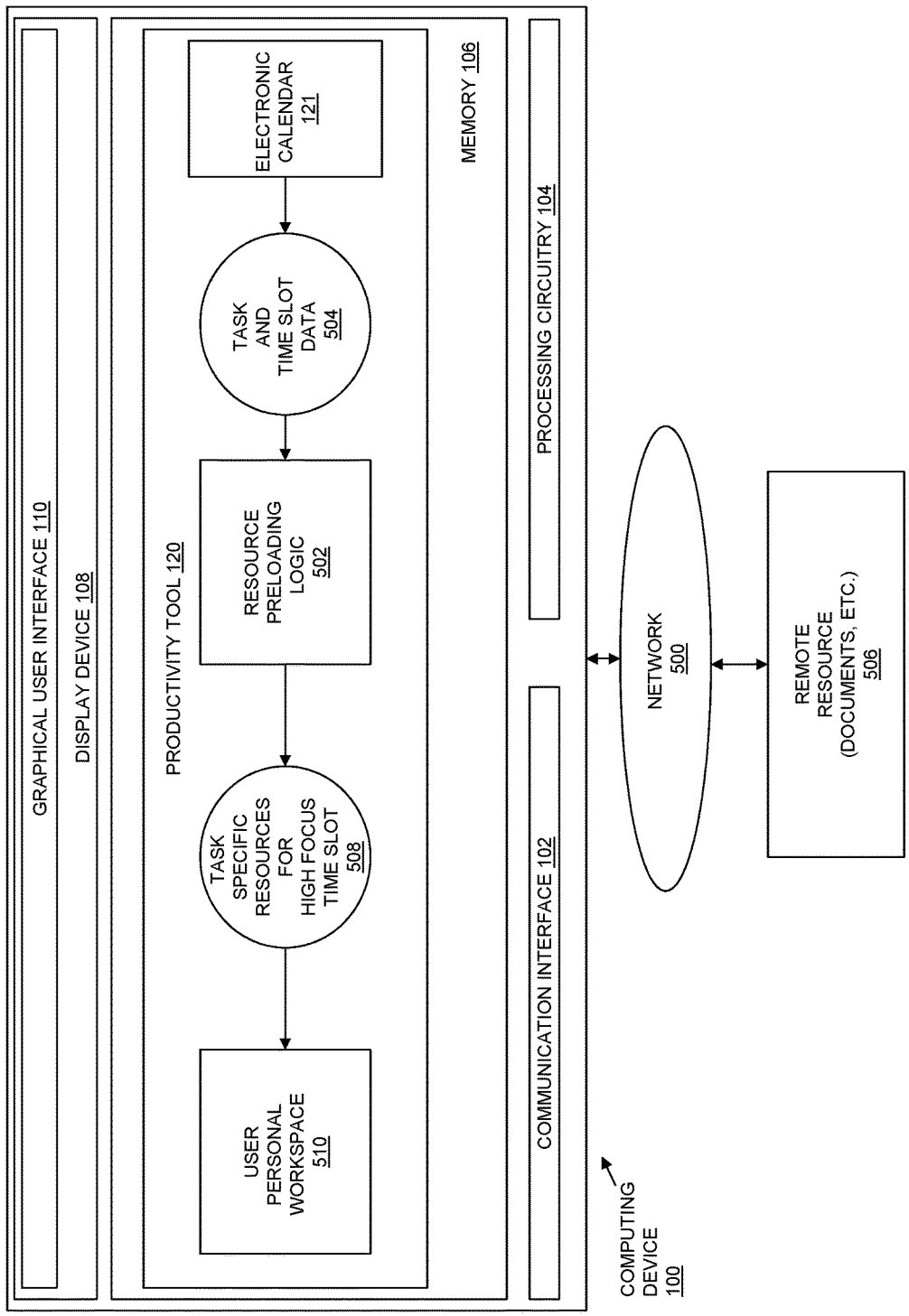
FIG. 5 is a block diagram showing components in an illustrative embodiment that identify resources needed by a user during a high focus time slot, and that pre-load the needed resources into a personal workspace of the user prior to the beginning of the high focus time slot.

FIG. 5 is a block diagram showing components in an illustrative embodiment that identify resources needed by a user during a high focus time slot, and that pre-load the resources into a personal workspace of the user prior to the beginning of the high focus time slot. For example, an embodiment of the components shown in FIG. 5 may operate to save a current state by saving pointers, names, or other identifiers that identify resources such as websites, open documents, open email s, open communication tools, music files, and/or other specific types of resources that are in use by the user at the end of a high focus time slot allocated to a chunk of a task. The disclosed system may then use the stored identifiers to restore the same state for the user prior to or at the beginning of the next high focus time slot allocated to another chunk of the same task, by opening the resources identified by the stored identifiers.

As shown in FIG. 5, Productivity Tool 120 may include Resource Preloading Logic 502 that receives Task and Time Slot Data 504 from Electronic Calendar 121. Task and Time Slot Data 504 may include indications of high focus time slots and the tasks to which the high focus time slots are allocated, and indications of resources previously used by the user during the current and/or one or more preceding high focus time slots. The resource indications contained in Task and Time Slot Data 504 may, for example, include pointers or links, such as Uniform Resource Locators (URLs) or the like, of websites, open documents, open emails, open communication tools and/or other programs, services, etc., and or contact information, such as telephone numbers, electronic mail addresses, etc., that were previously being used by the user to work on a specific task during the current and/or one or more preceding high focus time slots. For example, the resource indications in Task and Time Slot Data 504 may indicate or include state information (e.g. identifiers of websites, open documents, open emails, open communication tools and/or other programs, services, contact information, etc.) that was previously saved at the end of a high focus time slot allocated to a chunk of a specific task, and that is to be used by the disclosed system to automatically restore the user's state at or prior to the beginning of a subsequent high focus time slot allocated to another chunk of the same task. In one example, the resource indications contained in Task and Time Slot Data 504 may include or identify a playlist and/or sound files identifying and/or representing music that was previously being played during the current and/or one or more preceding high focus time slots.

Prior to a user beginning work on a task in a high focus time slot, or when the user resumes work on a task during a high focus time slot after an interruption, Resource Preloading Logic 502 uses Task and Time Slot Data 504 to identify the resources that the user was previously using to work on the same task during the current and/or one or more preceding high focus time slots, and to load those resources as Task Specific Resources for High Focus Time Slot 508 into the User Personal Workspace 510. For example, the Resource Preloading Logic 502 may restore (e.g. retrieve and/or open) websites, documents, emails, communication tools and/or other programs, services, etc., within the User Personal Workspace 510, using the state information that was automatically saved at the end of a previous high focus time slot allocated to a chunk of a specific task, at or prior to the beginning of another, subsequent high focus time slot allocated to another chunk of the same task.

For example, prior to the beginning of a high focus time slot allocated to meeting task, Resource Preloading Logic 502 may identify a document consisting of a meeting agenda that the user had opened during a previous high focus time slot also allocated to the same meeting task. In the illustrative example of FIG. 5, the meeting agenda is a remotely stored document shown by Remote Resource 506. The Task and Time Slot Data 504 may include a link to the meeting agenda document, as detected by and stored in Electronic Calendar 121 during the previous high focus time slot, and Resource Preloading Logic 502 may use the link to download a copy of the meeting agenda document and any other resources needed for the meeting task as Task Specific Resources for High Focus Time Slot 508. Resource Preloading Logic 502 may then load Task Specific Resources for High Focus Time Slot 508 into a local workspace of the user, shown in FIG. 5 by User Personal Workspace 510, prior to the beginning of the high focus time slot allocated to the meeting task. In this way, the disclosed system allows the user to begin working immediately on the high focus task at the beginning of the high focus time period, without having to load context for the task into their personal workspace during the high focus time slot.

In another example, Task and Time Slot Data 504 may include a playlist or the like identifying music being played on Computing Device 100 during a previous high focus time slot allocated to the same task that an upcoming high focus time slot is allocated to. Prior to the upcoming high focus time slot, Resource Preloading Logic 502 may load the playlist into the User Personal Workspace 510 as part of the Task Specific Resources for High Focus Time Slot 508. Resource Preloading Logic 502 may further cause the playlist loaded into User Personal Workspace 510 to automatically play at the beginning of the high focus time slot, e.g. by loading the playlist into a separate music player application. Alternatively, the playlist loaded into User Personal Workspace 510 may be automatically presented within the Graphical User Interface 110 for selection by at the beginning of the high focus time slot.

Figure 6:
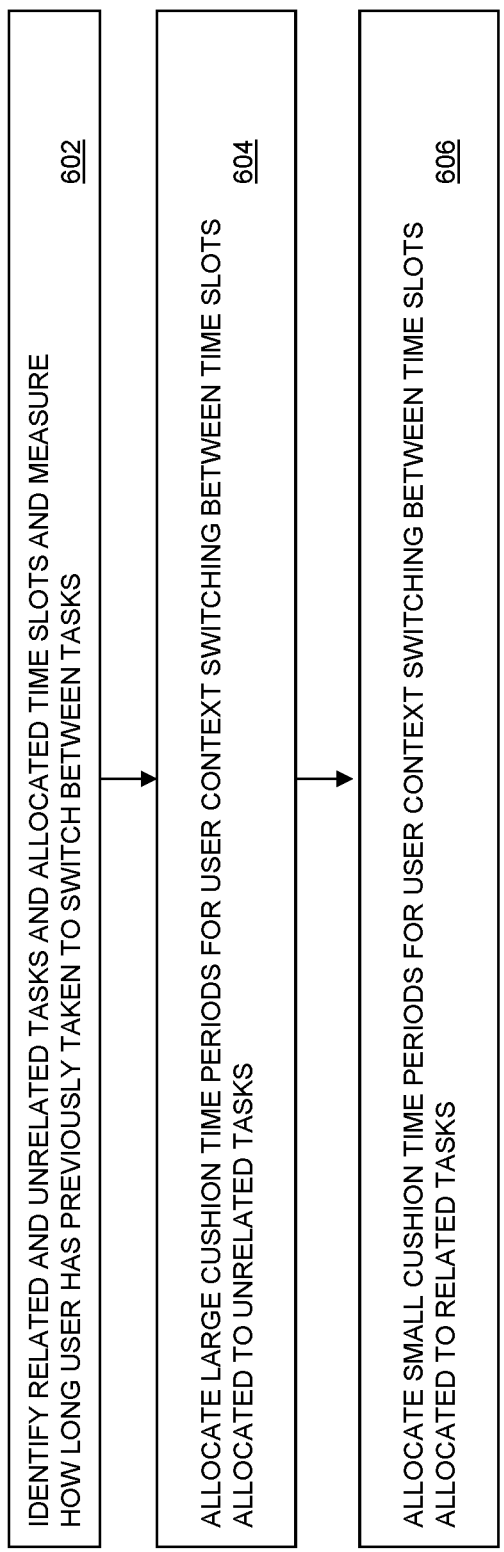
FIG. 6 is a flow chart showing an example of steps performed in an illustrative embodiment to allocate different duration cushion time periods between time slots in the electronic calendar based on the related-ness of the tasks to which the time slots are allocated, and/or on measurements of how long the user the user has previously taken to switch between tasks.

FIG. 6 is a flow chart showing an example of steps performed in an illustrative embodiment to allocate different duration cushion time periods between adjacent time slots in the electronic calendar, based on whether the tasks to which the adjacent time slots are allocated are related, and/or on measurements of how long the user has previously taken to switch between tasks. The steps of FIG. 6 may, for example, be performed by the Productivity Tool 120 (e.g. by Time Slot Allocation Logic 18). At step 602, the disclosed system identifies related and unrelated tasks, and the time slots that are allocated to the tasks. For example, each received task may include a list of other related tasks. Alternatively, the user may indicate through Graphical User Interface 110 a list of other related tasks for each task.

Also at step 602, in order to determine the specific lengths of cushion time periods to be inserted between time slots, the disclosed system may also measure the amount of time the user takes to switch between unrelated tasks. The disclosed system may measure the amount of time taken by the user to switch between unrelated tasks by measuring an amount of time between the user closing a document associated with a first task, and opening a document associated with a second, unrelated task. The disclosed system may alternatively use biometric data to determine an amount of time taken by the user to switch between unrelated tasks, for example by measuring an amount of time following the end of a time slot allocated to a first task until the user is seated at and facing their computer in the case that the following time slot is allocated to a second, unrelated task. The disclosed system may alternatively, or in addition, use other types of biometric data to determine the amount of time taken by the user to switch between unrelated tasks, such as outputs from one or more biosensors indicating the user's skin conductivity, brain activity, heart rate, breathing rate, pupil dilation, facial region biometrics, eye region biometrics, and/or other specific biometric data.

The disclosed system may also measure the amount of time taken by the user to switch between related tasks, for example by measuring an amount of time between the user closing a document associated with a first task and subsequently opening a document associated with a second, related task. The disclosed system may alternatively use biometric data to measure an amount of time taken by the user to switch between related tasks, for example by measuring an amount of time following the end of a time slot allocated to a first task until the user is seated at and facing their computer in the case that the following tie slot is allocated to a second, related task. The disclosed system may alternatively, or in addition, use other types of biometric data to determine the amount of time taken by the user to switch between related tasks, such as outputs from one or more biosensors indicating the user's skin conductivity, brain activity, heart rate, breathing rate, pupil dilation, facial region biometrics, eye region biometrics, and/or other specific biometric data.

An average of the measured amounts of time previously taken by the user to switch between unrelated tasks may then be used as the duration of a relatively large cushion time period allocated between time slots allocated to unrelated tasks. Accordingly, at step 604 the disclosed system may allocate relatively large cushion time periods for user context switching between time slots in the Electronic Calendar 121 that are allocated to unrelated tasks, where the duration of the relatively large cushion time period may be determined based on measured amounts of time previously taken by the user to switch between unrelated tasks. The disclosed system may also display the specific amounts of time taken by the user to switch between unrelated tasks, and/or the average amount of time taken by the user to switch between unrelated tasks, e.g. within the Graphical User Interface 110, so that the user is aware of the measured switching times and can work on improving them. Alternatively, the duration of the relatively large cushion time periods allocated in step 604 may, for example, be a predetermined amount of time that is configured (e.g. selected) by the user.

At step 606 the disclosed system allocates relatively small cushion time periods for user context switching between adjacent time slots in Electronic Calendar 121 that are allocated to related tasks. The duration of the relatively small cushion time periods allocated in step 606 may, for example, be a predetermined amount of time that is configured (e.g. selected) by the user, such as only a few minutes, in order to allow some minimal amount of context switching, or alternatively may be set to zero under the assumption that related tasks are those tasks that share a common context, and that accordingly no context switching time is required between related tasks.

An average of the measured amounts of time previously taken by the user to switch between related tasks may alternatively be used as the duration of the relatively small cushion time period allocated between time slots allocated to related tasks. Accordingly, at step 606 the disclosed system may allocate relatively small cushion time periods for user context switching between time slots in the Electronic Calendar 121 that are allocated to related tasks, where the duration of the relatively small cushion time period may be determined based on measured amounts of time previously taken by the user to switch between related tasks. The disclosed system may also display the specific amounts of time taken by the user to switch between related tasks, and/or the average amount of time taken by the user to switch between related tasks, e.g. within the Graphical User Interface 110, so that the user is aware of the measured switching times and can work on improving them.

Figure 7:
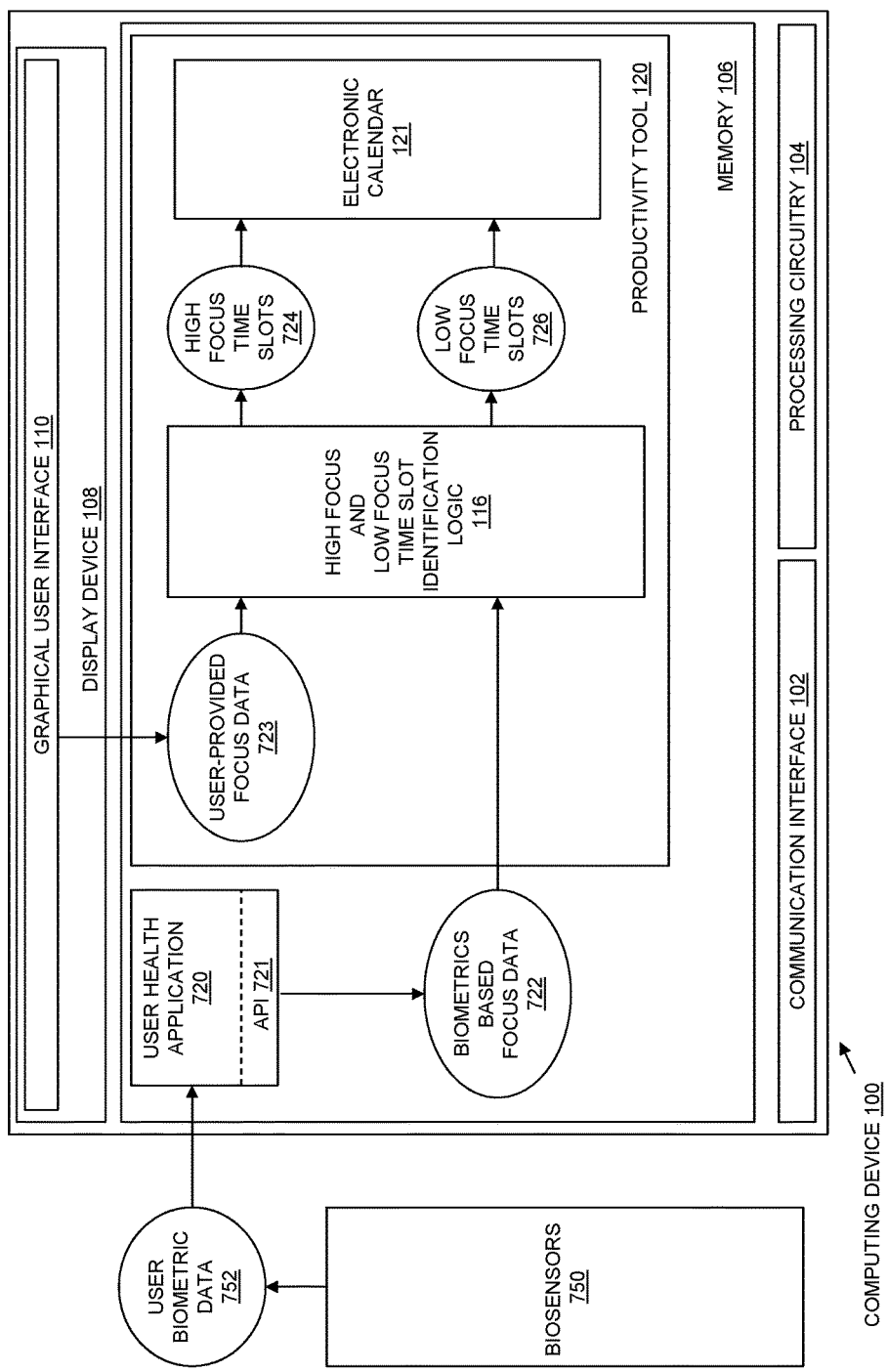
FIG. 7 is a block diagram showing components in an illustrative embodiment that generate and/or receive user focus data, including user focus data received from a user health application reflecting user biometric data, and/or user focus data received from a user interface indicating user focus levels provided by the user.

FIG. 7 is a block diagram showing components in an illustrative embodiment that generate and/or receive user focus data, including user focus data received from a user health application and based on user biometric data, and/or user focus data received from a user interface indicating user focus levels provided by the user. As shown in FIG. 7, in order for the High Focus and Low Focus Time Slot Identification Logic 116 to identify the durations and specific times of High Focus Time Slots 724 and Low Focus Time Slots 726 within the user's Electronic Calendar, the disclosed Productivity Tool 120 may receive user focus data (e.g. User Focus Data 111 in FIG. 1) that includes i) User-Provided Focus Data 723 from Graphical User Interface 110, e.g. consisting of or including current user focus levels indicated by the user, and/or ii) Biometrics Based Focus Data 722, e.g. consisting of or including current user focus levels output from an API (Application Programming Interface) 721 of an external application, shown for purposes of illustration in FIG. 7 by User Health Application 720.

In one example, the Productivity Tool 120 generates focus data for the user by periodically polling the user to obtain a current focus level indicating the user's level of engagement with their current task at different times of day. For example, the polling may include periodically prompting the user in Graphical User Interface 110 to enter, select, or otherwise indicate the user's current focus level in Graphical User Interface 110. The User-Provided Focus Data 723 generated in this way may consist of or include current focus levels indicated by the user at different times of day and collected within a previous polling period, e.g. within a previous day, a previous week, a previous month, etc.

Alternatively, or in addition, the focus data for the user may be generated by prompting the user (e.g. within Graphical User Interface 110) to expressly enter or otherwise indicate daily time periods during which the user typically has a high level of focus. For example, the user may indicate in Graphical User Interface 110 that they have high focus time between 8:00 AM and 10:00 AM and between 2:00 PM and 4:00 PM, as in the illustrative example of FIGS. 1 and 2.

In another example, the Productivity Tool 120 may receive focus data that is based on or includes biometric information describing the physical state of the user, and shown in FIG. 7 by Biometrics Based Focus Data 722. Biometrics Based Focus Data 722 may be received by High Focus and Low Focus Time Slot Identification Logic 116 from API 722 of User Health Application 720. The User Health Application 720 may be any application program operable to calculate current user focus levels based on User Biometric Data 752 received from one or more Biosensors 750. In the context of the disclosed system, Biosensors 750 may include any specific type of sensor operable to detect biometric data that describes physical/biological characteristics of the user related to the user's current level of focus. User Biometric Data 752 may include any specific type of biometric data output by Biosensors 750 that describes the user's physical state at different times of day.

For example, Biosensors 750 may include electronic accessories and/or wearable technology that directly monitor the user's physical state, e.g. the user's physiology and/or biochemistry. For example, Biosensors 750 may include an activity tracker device or the like that is worn by the user, that may be wirelessly connected to computing device 100 (e.g. through Communication Interface 102), and that outputs biometric data including the user's current physical location. In another example, Biosensors 750 may include wearable technology that is worn by the user, that also may be wirelessly connected to Computing Device 100, and that outputs biometric data including the current physical orientation of the user's body, e.g. whether the user is sitting upright, whether the user is facing their computer (e.g. Computing Device 100), etc. In another example, Biosensors 750 may include one or more digital cameras connected to the Computer Device 100, that may output biometric data including digital image or video data indicating the user's current physical location (e.g. whether the user is located in the same room as and/or in front of Computing Device 100), and/or physical orientation (e.g. whether the user is sitting upright, whether the user is facing Computing Device 100, etc.). The digital image or video data output by the digital camera or cameras may include, and/or be processed by User Health Application 720 to provide, facial region and/or eye region biometrics. User Biometric Data 752 output by Biosensors 750 may further include skin conductivity, brain activity, heart rate, breathing rate, pupil dilation, and/or other specific biometric data regarding the physical state of the user.

User Health Application 720 may be any application that operates to collect and/or analyze biometric data received from Biosensors 750, and that generates and outputs Biometrics Based Focus Data 722. Biometrics Based Focus Data 722 includes indications of the user's current focus level at different times of day, as determined by the User Health Application 720 based on the User Biometric Data 752.

For example, User Health Application 720 may generate and output Biometrics Based Focus Data 722 indicating that the user has a high level of focus at times of day i) when the user is located in front of Computing Device 100, ii) when the user is sitting in an upright position, and/or iii) when the user is facing Computing Device 100. In addition, User Health Application 720 may generate Biometrics Based Focus Data 722 indicating that the user has a low level of focus at times of day i) when the user is located away from Computing Device 100 (e.g. is located in an area of the room that is more than a threshold distance from Computing Device 100, and/or is located in a room other than the room in which Computing Device 100 is located), ii) when the user is facing away from Computing Device 100, and/or iii) when the user is not sitting in an upright position.

Alternatively, or in addition, User Health Application 720 may generate and output Biometrics Based Focus Data 722 that is based on User Biometric Data 752 such as measurements of skin conductivity, brain activity, heart rate, breathing rate, pupil dilation, and/or other specific biometric data regarding the physical state of the user, such as facial region and/or eye region biometrics.

In another example embodiment, User Health Application 720 may collect baseline measurements of one or more specific user biometrics taken during one or more training sessions. For example, baseline high focus measurements of one or more specific user biometrics may be taken during a first training session held when the user is known to have a high level of focus, such as during a time following a full night's rest (e.g. minimum of 8 hours), and/or while the user is performing a standard high focus task, such as solving a complex puzzle presented in Graphical User Interface 110. Baseline low focus measurements of the same user biometrics may also be taken during a second training session held when the user is known to have a low level of focus, such as during a time following a full day of work, and/or after instructing the user to clear his or her mind. User Health Application 720 may subsequently generate and output Biometrics Based Focus Data 722 indicating that the user has a high level of focus at times of day when the values of the user biometrics in User Biometric Data 752 match or are relatively closer to the baseline high focus measurements. User Health Application 720 may also generate and output Biometrics Based Focus Data 722 indicating that the user has a low level of focus at times of day when the values of the user biometrics in User Biometric Data 752 match or are relatively closer to the baseline low focus measurements.

Figure 8:
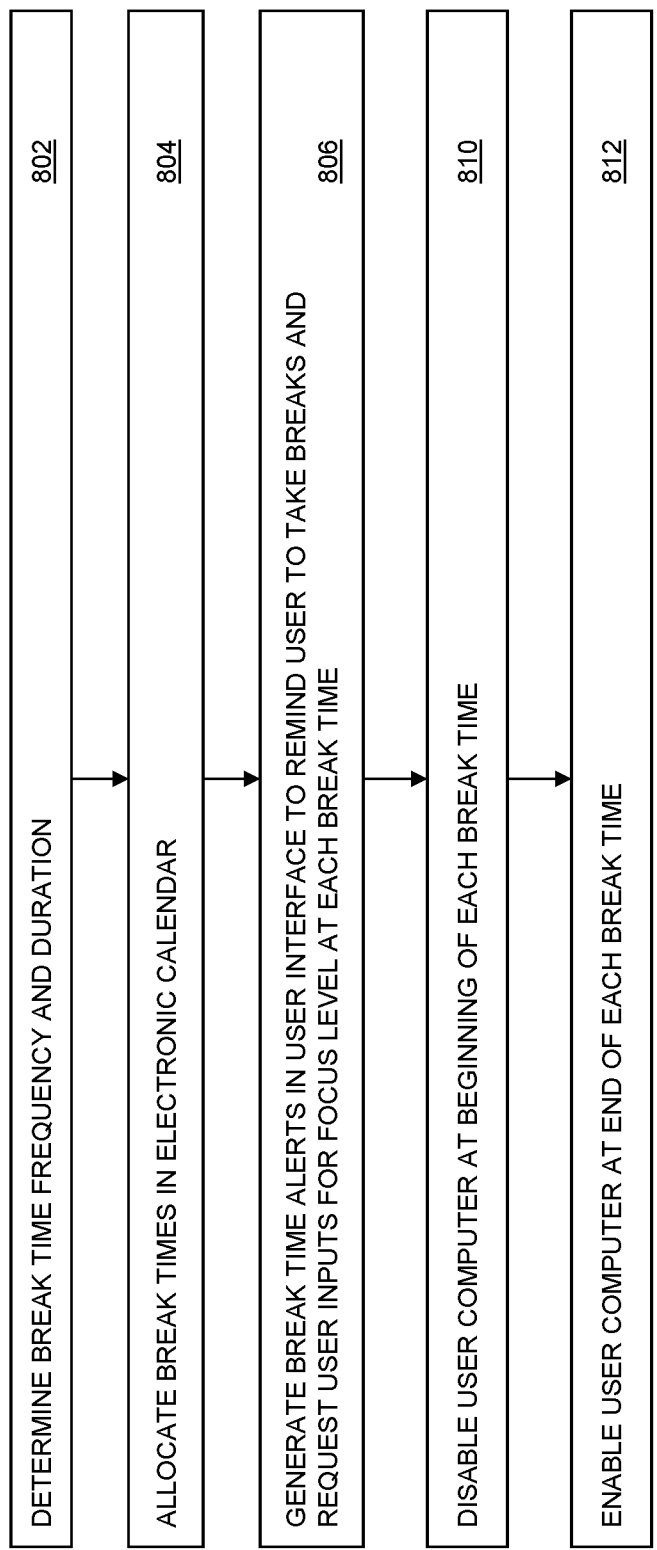
FIG. 8 is a flow chart showing an example of steps performed in an illustrative embodiment to maximize user focus time by allocating break times for the user within an electronic calendar.

FIG. 8 is a flow chart showing an example of steps performed in an illustrative embodiment to maintain and/or maximize the user's high focus time by automatically allocating break times for the user within the Electronic Calendar 121 (FIG. 1), during which no task is scheduled. The steps of FIG. 8 may, for example, be performed by the High Focus and Low Focus Time Slot Identification Logic 116, and/or within other program logic contained in the Productivity Tool 120 shown in FIG. 1.

At step 802, the disclosed system determines a frequency at which break times should be scheduled for the user, and a break time duration. The frequency and duration of the automatically scheduled break times may, for example, be calculated based on user focus data obtained over a preceding time period indicating i) an average amount of time during which the user can maintain a high level of focus, and ii) an average amount of time after the user stops having a high level of focus before they again have a high level of focus. Alternatively, the frequency and duration of the automatically scheduled break times may be user configurable settings obtained from the user through Graphical User Interface 110. In one embodiment.

At step 804, the disclosed system allocates break times in the Electronic Calendar 104, for example on a periodic basis (e.g. a ten minute break is allocated each hour throughout the workday). No tasks are scheduled for the user during the allocated break times. Alternatively, or in addition, break times may be allocated dynamically, in response to real-time determinations that the current focus level of the user has changed from a high focus level to a low focus level, for example as indicated in real-time by Biometrics Based Focus Data 722.

At step 806, the disclosed system generates break time alerts (e.g. visual alerts displayed within Graphical User Interface 110) that remind the user to take a break at the beginning of each allocated break time. Further at step 806, during operation in which break times are allocated on a periodic basis, the disclosed system may also simultaneously poll the user for current focus level data at the beginning of each break time, i.e. request that the user indicate their current focus level within the Graphical User Interface 110. The request for an indication of the user's current focus level may, for example, be generated within the break time alert displayed at the beginning of each break time. The indications provided by the user of their current focus level may be an example of the User-Provided Focus Data 723 shown in FIG. 7.

In order to ensure that the user actually takes a break, at step 810 the disclosed system may also disable operation of the user's computer at the beginning of each break time, and then re-enable operation of the user's computer at the end of each break time in step 812.

Figure 9:
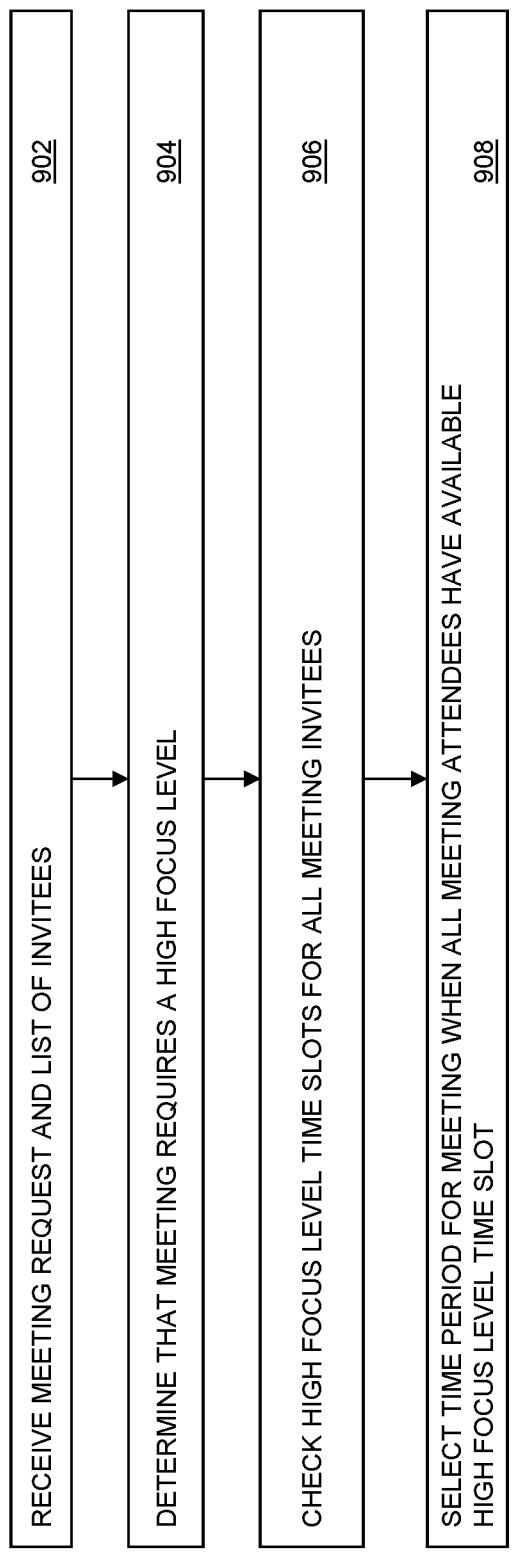
FIG. 9 is a flow chart showing an example of steps performed in an illustrative embodiment to schedule a meeting that requires a high focus level according to high focus time slots of all meeting invitees.

The disclosed productivity tool may also take user focus level into consideration when scheduling meetings in the electronic calendar. FIG. 9 is a flow chart showing an example of steps performed in an illustrative embodiment to schedule a high focus level meeting according to high focus time slots of all meeting invitees. The steps of FIG. 9 may, for example, be performed by program code within the Productivity Tool 120.

At step 902, when a request is received to allocate time in the electronic calendar for a meeting with multiple invitees, the disclosed system checks at step 904 whether the requested meeting requires a high focus level. For example, the request to allocate time in the electronic calendar for a meeting may be generated based on user inputs to the graphical user interface, including an indication of a focus level required for the meeting (e.g. high focus level or low focus level), and a list of meeting invitees (e.g. containing an electronic mail address or the like for each invitee), as part of a request to set up a meeting made by the local user through the graphical user interface. In the case where the disclosed system detects at step 904 that the meeting requires a high focus level, at step 906 the disclosed system obtains data describing the beginning time and end time of one or more available high focus level time slots for each meeting invitee (e.g. from the local electronic calendar for the user and/or by sending a high focus level time slot information request to the electronic calendar of each invitee). At step 908 the disclosed system selects a time for the meeting that occurs within a high focus level time slot in the electronic calendar of each one of the meeting invitees. The time selected for the meeting at step 908 may then be displayed to the local user within the graphical user interface for approval by the user prior to transmitting the meeting invitations to the meeting invitees and/or prior to allocating time for the meeting in the user's electronic calendar.

Figure 10:
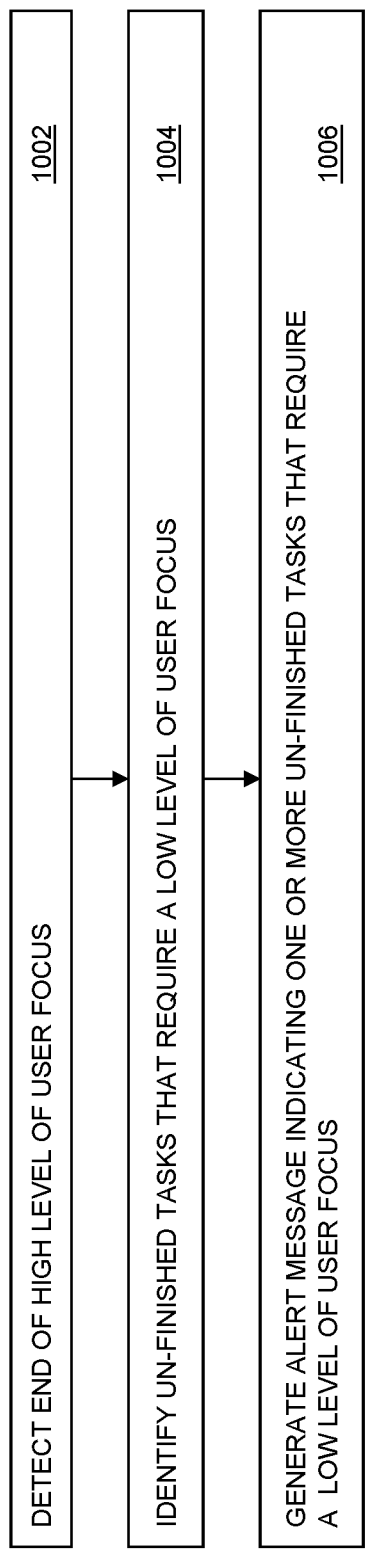
FIG. 10 is a flow chart showing an example of steps performed in an illustrative embodiment to provide an alert message at the end of the user's high level of focus regarding one or more un-finished tasks that require a low level of user focus.

FIG. 10 is a flow chart showing an example of steps performed in an illustrative embodiment to provide an alert message at the end of the user's high level of focus regarding one or more un-finished tasks that require a low level of user focus. The steps of FIG. 10 may, for example, be performed by program code within the Productivity Tool 120. At step 1002, the disclosed system detects an end of a time period during which the user had a high level of focus. For example, the disclosed system may detect an end of the user's high level of focus in response to detecting an end of a current high focus time slot. Alternatively, the disclosed system may detect an end of the user's high level of focus in response to dynamically detecting in real-time that the current focus level of the user has changed from a high level of focus to a low level of focus. For example, the disclosed system may dynamically detect an end of the user's high level of focus in response to Biometrics Based Focus Data 722 and/or User-Provided Focus Data 723 (FIG. 7) indicating the user's current level of focus has changed from a previous high level of focus to a current low level of focus.

In response to detecting an end of the user's high level of focus, at step 1004 the disclosed system identifies one or more unfinished tasks that require a low level of user focus. For example, at step 1004 the disclosed system may identify one or more unfinished tasks scheduled for upcoming low focus time slots in the electronic calendar.

At step 1006 the disclosed system generates an alert message indicating the unfinished tasks that require a low level of user focus identified in step 1004. For example, at step 1006, the disclosed system generates a visual alert in the Graphical User Interface 110 containing a list of the names of the unfinished tasks that require a low level of user focus identified in step 1004. In this way the disclosed system brings tasks to the user's attention that require a low level of user focus at a time when the user no longer has a high level of user focus, so that tasks that require a low level of focus are not neglected.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of managing tasks based on user focus level, comprising executing, on at least one processor, the steps of:
   Obtaining baseline high focus measurements of one or more biometrics for a user;
   Obtaining baseline low focus measurements of the one or more biometrics for the user;
   Obtaining biometric information from at least one biosensor at multiple times of day;
   Generating focus data indicating the user's level of focus at the multiple times of day as indicated by the biometric information obtained from the at least one biosensor at least in part by:
      Indicating that the user has a high level of focus at those ones of the multiple times of day when values of the biometric information obtained from the at least one biosensor are relatively closer to the baseline high focus measurements, and
      Indicating that the user has a low level of focus at those ones of the multiple times of day when values of the biometric information obtained from the at least one biosensor are relatively closer to the baseline low focus measurements;
   identifying, within an electronic calendar of an electronic productivity tool, and responsive to the focus data indicating the user's level of focus at multiple times of day as indicated by the biometric information obtained from the at least one biosensor and indications entered by the user of daily time periods during which the user typically has a high level of focus, high focus time slots during which the user has the high level of focus, and low focus time slots during which the user has a low level of focus;
   Receiving tasks for completion by the user, each task indicating a required level of user focus; and
   performing an electronic scheduling operation for each received task, wherein the electronic scheduling operation allocates a set of the high focus time slots in the electronic calendar to each of the received tasks that indicates a high required level of user focus, and wherein the electronic scheduling operation allocates a set of the low focus time slots in the electronic calendar to each of the received tasks that indicates a low required level of user focus.

2. The method of claim 1, further comprising:
   Generating a user interface for accepting inputs from the user regarding at least one of the received tasks; and
   Receiving a required level of focus for the at least one of the received tasks through the generated user interface.

3. The method of claim 1, further comprising:
   Generating a required level of focus for at least one of the received tasks by
      Comparing an amount of time required to complete the task to a duration of a single high focus time slot,
      generating a high required level of focus in response to the time required to complete the task exceeding the duration of the single high focus time slot, and
      Generating a low required level of focus in response to the time required to complete the task not exceeding the duration of the single high focus time slot.

4. The method of claim 3, further comprising:
   further in response to the amount of time required to complete one of the received tasks exceeding the duration of the single high focus time slot, dividing the received task into multiple chunks, each of the chunks having a duration that not exceeding the duration of the single high focus time slot; and
   Wherein allocating the set of high focus time slots to the received task includes allocating a high focus time slot on each one of multiple days to working on a different individual one of the chunks of the received task.

5. The method of claim 1, wherein performing the electronic scheduling operation further includes:
   Identifying a plurality of received tasks that are related;
   Searching the electronic calendar for a set of adjacent time slots that are available for allocation; and
   Allocating each of the time slots in the set of adjacent time slots to a respective one of the plurality of related tasks.

6. The method of claim 5, wherein identifying the plurality of received tasks that are related includes searching those of the received tasks that indicate a high required level of focus for a set of at least two tasks are related to each other and that indicate a high required level of focus.

7. The method of claim 1, further comprising:
   Controlling interruption requests received during at least one of the high focus time slots by
      Identifying high priority and low priority interruption requests received during the high focus time slot,
      Delivering the high priority interruption requests to the user during the high focus time slot,
      Storing the low priority interruption requests on a queue during the high focus time slot, and
      Delivering the low priority interruption requests stored on the queue to the user at the end of the high focus time slot.

8. The method of claim 1, further comprising:
   Controlling interruption requests received during at least one of the high focus time slots by
      Identifying high priority and low priority interruption requests received during the high focus time slot, and
      Delivering an identifier of an alternative, high priority communication channel to a requester associated with each of the high priority interruption requests.

9. The method of claim 1, further comprising:
   Reducing the user's context switching time at the beginning of at least one of the high focus time slots by
      i) Identifying resources needed by the user during the high focus time slot, and
      ii) automatically pre-loading the resources needed by the user during the high focus time slot into a personal workspace of the user, prior to the beginning of the high focus time slot, so that they are accessible to the user at the beginning of the high focus time slot.

10. The method of claim 9, wherein identifying resources needed by the user during the high focus time slot includes identifying music that the user was listening to during a previous high focus time slot; and
   Wherein automatically pre-loading the resources needed by the user during the high focus time slot includes playing the music that the user was listening to during the previous high focus time slot at the beginning of the high of the high focus time slot.

11. The method of claim 1, wherein performing the electronic scheduling operation for each received task includes scheduling related tasks in adjacent time slots by:
   Identifying a time slot previously allocated in the electronic calendar to another one of the received tasks that is related to the received task; and
   Allocating a time slot in the electronic calendar for the received task that is adjacent to the time slot previously allocated to the other one of the received tasks that is related to the received task.

12. The method of claim 11, further comprising:
Automatically allocating cushion time periods in the electronic calendar, to allow time for the user to switch between different tasks, by
  i) allocating cushion time periods having first duration between time slots allocated to related tasks, and
  ii) Allocating cushion time periods having a second duration between time slots allocated to un-related tasks, wherein the second duration is larger than the first time period.

13. The method claim 12, further comprising:
generating the first duration by measuring amounts of time taken by the user to switch between related tasks, calculating an average of the amounts of time taken by the user to switch between related tasks, and setting the first duration to the average of the amounts of time taken by the user to switch between related tasks; and
Generating the second duration by measuring amounts of time taken by the user to switch between un-related tasks, calculating an average of the amounts of time taken by the user to switch between un-related tasks, and setting the second duration to the average of the amounts of time taken by the user to switch between un-related tasks.

14. The method claim 13, further comprising:
wherein measuring amounts of time taken by the user to switch between related tasks includes using biometric data to determine amounts of time taken by the user to switch between related tasks; and
Wherein measuring amounts of time taken by the user to switch between un-related tasks includes using biometric data to determine amounts of time taken by the user to switch between un-related tasks.

15. The method of claim 1, further comprising:
generating focus data for the user by automatically polling the user to obtain a current focus level indicating the user's level of engagement with a current task, wherein the polling includes periodically prompting the user to indicate a current focus level, wherein the focus data for the user comprises current focus levels indicated by the user at different times of day within a previous polling period; and
Wherein identifying the high focus time slots and the low focus time slots in the electronic calendar is in response to the focus data generated for the user.

16. The method of claim 1, further comprising:
Generating focus data for the user by prompting the user to indicate the daily time periods during which the user typically has the high level of focus;
Wherein the focus data for the user comprises the daily time periods indicated by the user during which the user typically has the high level of focus; and
Wherein identifying the high focus time slots and the low focus time slots in the electronic calendar is in response to the focus data generated for the user.

17. The method of claim 1, further comprising:
Receiving the focus data for the user from an application programming interface of a user health application program.

18. The method of claim 1, further comprising:
Automatically allocating break times for the user within the electronic calendar, wherein no task is scheduled during the break times; and
Automatically alerting the user at the beginning of each break time.

19. The method of claim 18, wherein allocating break times for the user within the electronic calendar comprises allocating periodically recurring break times, wherein alerting the user at the beginning of each includes polling the user for an indication of a current focus level, and further comprising:
generating focus data for the user including current focus levels indicated by the user at the beginning of the periodically recurring breaks over a polling period; and
Wherein identifying the high focus time slots and the low focus time slots in the electronic calendar is in response to the generated focus data for the user.

20. The method of claim 19, further comprising:
Disabling operation of a computer associated with the user at the beginning of each allocated break time; and
Re-enabling operation of the computer associated with the user at the end of each allocated break time.

21. The method of claim 1, further comprising:
Receiving a request to allocate time for a meeting in the electronic calendar, the meeting having multiple invitees;
Detecting that the meeting requires a high focus level; and
Selecting a time for the meeting occurring within a high focus time slot of each of the meeting invitees.

22. The method of 1, further comprising:
Delivering, to the user through a graphical user interface at the end of one of the high focus time slots, a reminder indicating one of the received tasks that indicates a low required level of user focus.

23. The method of claim 1, wherein obtaining the baseline high focus measurements of one or more user biometrics comprises obtaining the baseline high focus measurements of the one or more user biometrics during a first training session held when the user is known to have a high level of focus.

24. The method of claim 23, wherein obtaining the baseline low focus measurements of the one or more user biometrics comprises obtaining the baseline low focus measurements of the one or more user biometrics during a second training session held when the user is known to have a low level of focus.

25. A device for managing tasks based on user focus level, comprising:
Memory;
At least one biosensor; and
Processing circuitry coupled to the memory and the at least one biosensor, the memory storing program code that, when executed by the processing circuitry, causes the processing circuitry to provide an electronic productivity tool by:
  Obtaining baseline high focus measurements of one or more biometrics for a user;
  Obtaining baseline low focus measurements of the one or more biometrics for the user;
  Obtaining biometric information from the at least one biosensor at multiple times of day;
  Generating focus data indicating the user's level of focus at the multiple times of day as indicated by the biometric information obtained from the at least one biosensor at least in part by:
    Indicating that the user has a high level of focus at those ones of the multiple times of day when values of the biometric information obtained from the at least one biosensor are relatively closer to the baseline high focus measurements, and
    Indicating that the user has a low level of focus at those ones of the multiple times of day when values of the biometric information obtained from the at least one biosensor are relatively closer to the baseline low focus measurements;

identifying, within an electronic calendar, and responsive to the focus data indicating the user's level of focus at multiple times of day as indicated by biometric information obtained from the at least one biosensor and indications entered by the user of daily time periods during which the user typically has a high level of focus, high focus time slots during which the user has the high level of focus, and low focus time slots during which the user has a low level of focus;

Receiving tasks for completion by the user, each task indicating a required level of user focus; and performing an electronic scheduling operation for each received task, wherein the electronic scheduling operation allocates a set of the high focus time slots in the electronic calendar to each of the received tasks that indicates a high required level of user focus, and wherein the electronic scheduling operation allocates a set of the low focus time slots in the electronic calendar to each of the received tasks that indicates a low required level of user focus.

26. A computer program product having a non-transitory computer readable medium which stores a set of instructions operable to manage tasks based on user focus level, the set of instructions, when carried out by processing circuitry, causing the processing circuitry to:

Obtain baseline high focus measurements of one or more biometrics for a user;

Obtain baseline low focus measurements of the one or more biometrics for the user;

Obtain biometric information from at least one bio sensor at multiple times of day;

Generate focus data indicating the user's level of focus at the multiple times of day as indicated by the biometric information obtained from the at least one biosensor at least in part by:

Indicating that the user has a high level of focus at those ones of the multiple times of day when values of the biometric information obtained from the at least one biosensor are relatively closer to the baseline high focus measurements, and Indicating that the user has a low level of focus at those ones of the multiple times of day when values of the biometric information obtained from the at least one biosensor are relatively closer to the baseline low focus measurements;

identify, within an electronic calendar of an electronic productivity tool, and responsive to the focus data indicating the user's level of focus at multiple times of day as indicated by the biometric information obtained from the at least one biosensor and indications entered by the user of daily time periods during which the user typically has a high level of focus, high focus time slots during which the user has the high level of focus, and low focus time slots during which the user has a low level of focus;

Receive tasks for completion by the user, each task indicating a required level of user focus; and perform an electronic scheduling operation for each received task, wherein the electronic scheduling operation allocates a set of the high focus time slots in the electronic calendar to each of the received tasks that indicates a high required level of user focus, and wherein the electronic scheduling operation allocates a set of the low focus time slots in the electronic calendar to each of the received tasks that indicates a low required level of user focus.

* * * * *